(12) United States Patent
Fuka et al.

(10) Patent No.: US 11,968,202 B2
(45) Date of Patent: Apr. 23, 2024

(54) SECURE AUTHENTICATION IN ADVERSE ENVIRONMENTS

(71) Applicant: Avast Software s.r.o., Prague (CZ)

(72) Inventors: Karel Fuka, Prague (CZ); Vojtěch Tůma, Brtnice (CZ)

(73) Assignee: Avast Software s.r.o., Prague (CZ)

( * ) Notice: Subject to any disclaimer, the term of this patent is extended or adjusted under 35 U.S.C. 154(b) by 238 days.

(21) Appl. No.: 16/422,591

(22) Filed: May 24, 2019

(65) Prior Publication Data

US 2020/0374277 A1 Nov. 26, 2020

(51) Int. Cl.
*H04L 29/06* (2006.01)
*H04L 9/40* (2022.01)

(52) U.S. Cl.
CPC .................................. *H04L 63/083* (2013.01)

(58) Field of Classification Search
CPC ... H04L 63/08; H04L 63/083; H04L 63/0853; H04L 9/00; H04L 9/32
See application file for complete search history.

(56) References Cited

U.S. PATENT DOCUMENTS

| | | | |
|---|---|---|---|
| 5,469,507 A | 11/1995 | Canetti et al. | |
| 5,757,916 A | 5/1998 | MacDoran et al. | |
| 5,757,918 A | 5/1998 | Hopkins | |
| 6,185,316 B1 | 2/2001 | Buffam | |
| 7,631,195 B1* | 12/2009 | Yu | H04L 9/3226 713/189 |
| 8,453,925 B2 | 6/2013 | Fisher et al. | |
| 2003/0217268 A1* | 11/2003 | Gantman | H04K 1/00 713/172 |
| 2005/0250473 A1* | 11/2005 | Brown | H04L 9/3236 455/411 |
| 2006/0293606 A1 | 12/2006 | Tomita | |
| 2007/0255959 A1* | 11/2007 | Jung | H04L 9/0844 726/19 |
| 2009/0240943 A1* | 9/2009 | Brown | H04L 63/083 713/171 |

(Continued)

FOREIGN PATENT DOCUMENTS

JP 2003058190 A 2/2003

OTHER PUBLICATIONS

Panagiotis Papadimitratos et al., Secure Data Transmission in Mobile Ad Hoc Networks, Sep. 19, 2003, ACM, pp. 41-50. (Year: 2003).*

Jeremiahblocki et al., GotchaPasswordHackers!, Nov. 4, 2013, ACM, pp. 25-34. (Year: 2013).*

(Continued)

*Primary Examiner* — Luu T Pham
*Assistant Examiner* — Fahimeh Mohammadi
(74) *Attorney, Agent, or Firm* — AVEK IP, LLC; Mark C. Young; William B. Kircher

(57) ABSTRACT

A method of authenticating a user to a computer in an adverse environment includes receiving the user's password in a trusted user device, such as by the user typing the password, and encoding a keyword with a hash of the entered password to create an encoded keyword. The encoded keyword is sent from the trusted user device to the computer using a physical communication channel perceivable by the user; and the encoded keyword is compared in the computer with a keyword encoded with a known hash of the user's password in the computer to authenticate the user.

16 Claims, 5 Drawing Sheets

(56) References Cited

U.S. PATENT DOCUMENTS

| | | | | |
|---|---|---|---|---|
| 2009/0322476 | A1* | 12/2009 | Kassiedass | H04L 9/0866 340/5.74 |
| 2010/0030838 | A1* | 2/2010 | Atsmon | A63H 3/28 709/200 |
| 2010/0095112 | A1* | 4/2010 | Starr | G06F 21/6218 713/153 |
| 2011/0258443 | A1* | 10/2011 | Barry | H04L 9/3247 713/168 |
| 2013/0166918 | A1* | 6/2013 | Shahbazi | H04L 9/0863 713/183 |
| 2014/0129231 | A1 | 5/2014 | Herring et al. | |
| 2015/0215299 | A1* | 7/2015 | Burch | H04L 63/18 726/5 |
| 2016/0323108 | A1* | 11/2016 | Bhogal | H04L 63/123 |
| 2017/0249135 | A1* | 8/2017 | Gandhi | H04L 63/0492 |
| 2017/0366354 | A1* | 12/2017 | Alomair | H04L 9/3242 |
| 2018/0152839 | A1* | 5/2018 | Arribas | H04L 63/083 |
| 2018/0288026 | A1* | 10/2018 | Callaghan | H04L 9/3226 |
| 2019/0182044 | A1* | 6/2019 | Mullen | H04L 9/3247 |

OTHER PUBLICATIONS

Lei Wang et al., Password Recovery Attack on Authentication Protocol MD4(Password || Challenge), Mar. 18, 2008, ACM, pp. 3-9. (Year: 2008).*

Anna Vapen et al., 2-clickAuth—Optical Challenge-Response Authentication, Mar. 25, 2010, IEEE, pp. 79-86. (Year: 2010).*

Multi-factor authentication, https://en.wikipedia.org/wiki/Multi-factor_authentication, 10 pages. Accessed: Aug. 23, 2019.

Karapanos et al., Sound-Proof: Usable Two-Factor Authentication Based on Ambient Sound, arXiv:1503.03790v3, Aug. 3, 2015, pp. 1-16.

SoundLogin—two factor authentication, https://web.archive.org/web/20190119002834/https://www.soundlogin.com/, 2 pages. Accessed: Aug. 23, 2019.

Authentication Trends for 2017, https://blog.unloq.io/authentication-trends-for-2017-5f346a2c0823, 13 pages. Accessed: Aug. 23, 2019.

Morse code, https://web.archive.org/web/20190520151505/https://en.wikipedia.org/wiki/Morse_code, 21 pages. Accessed: Aug. 23, 2019.

QR Code, https://web.archive.org/web/20190523130128/https://en.wikipedia.org/wiki/QR_code, 22 pages. Accessed: Aug. 23, 2019.

* cited by examiner

SECURE AUTHENTICATION IN ADVERSE ENVIRONMENTS

FIELD

The invention relates generally to user authentication in computer systems, and more specifically to secure authentication in adverse environments.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the Internet is used for such a wide variety of private activities, from communication such as email to online shopping and banking, it is critical to maintain the privacy and security of a user's accounts. This is typically achieved by each service provider asking each user to choose a user ID and password, which are kept confidential and must be entered each time they wish to use their online account or service. But, with users often having dozens or even hundreds of online accounts with various merchants, service providers, social media, and other online services, remembering a large number of user ID and passwords can be daunting. Many users therefore repeat the same user ID and password combinations across many accounts, meaning that if a user's login credentials for one service are discovered or stolen, the credentials may be used to log into many different accounts of the user.

Passwords can be lost or stolen by a variety of means, including tricking people into disclosing them to parties other than the service provider (often called "social engineering"), by hacking or stealing encrypted or unencrypted password and user ID records from service providers, or by monitoring the user's password entry using hardware, software, or simple human observation. Because users typically reuse passwords across many services, a stolen password can result in disruption of almost every aspect of a person's life, from financial risks like banking, credit, and identity theft to theft and possible public distribution of photos, texts, and emails of a personal nature.

Although some passwords are stolen by simply watching a user type their password in a public environment, technical means that are less obvious and labor intensive are often employed, such as using a hardware or software keystroke logger. These loggers record each keystroke made at a computer for later observation or playback, such as by using software that logs each keystroke made at a particular computer or a hardware device inserted between the keyboard and the computer (often a USB device that plugs in between the computer and the keyboard cable). Software keystroke loggers may not require the password hacker to return to the computer to retrieve stolen passwords, while hardware loggers typically can't be detected by malware detection software and don't require being able to log on to a computer to install.

Although a personal computer in one's home is likely reasonably secure against hardware keystroke logger being installed without one's consent, some environments such as shared work computers or public computers in libraries, coffee shops, or other locations in such adverse environments are significantly less secure and more prone to keystroke loggers and other malware that may intercept a password.

A need therefore exists for a password mechanism that provides for security of the password in adverse environments.

SUMMARY

One example embodiment of the invention comprises authenticating a user to a computer in an adverse environment includes receiving the user's password in a trusted user device, such as by the user typing the password, and encoding a keyword with a hash of the entered password to create an encoded keyword. The encoded keyword is sent from the trusted user device to the computer using a physical communication channel perceivable by the user; and the encoded keyword is compared in the computer with a keyword encoded with a known hash of the user's password in the computer to authenticate the user.

In a further example, the physical communication channel comprises an audio channel, such as use of a speaker and a microphone, or an imagery channel, such as use of a display and a camera.

In another example, the keyword is generated in the computer and is sent to the trusted user device using the physical communication channel.

The details of one or more examples of the invention are set forth in the accompanying drawings and the description below. Other features and advantages will be apparent from the description and drawings, and from the claims.

DETAILED DESCRIPTION

Figure 1:
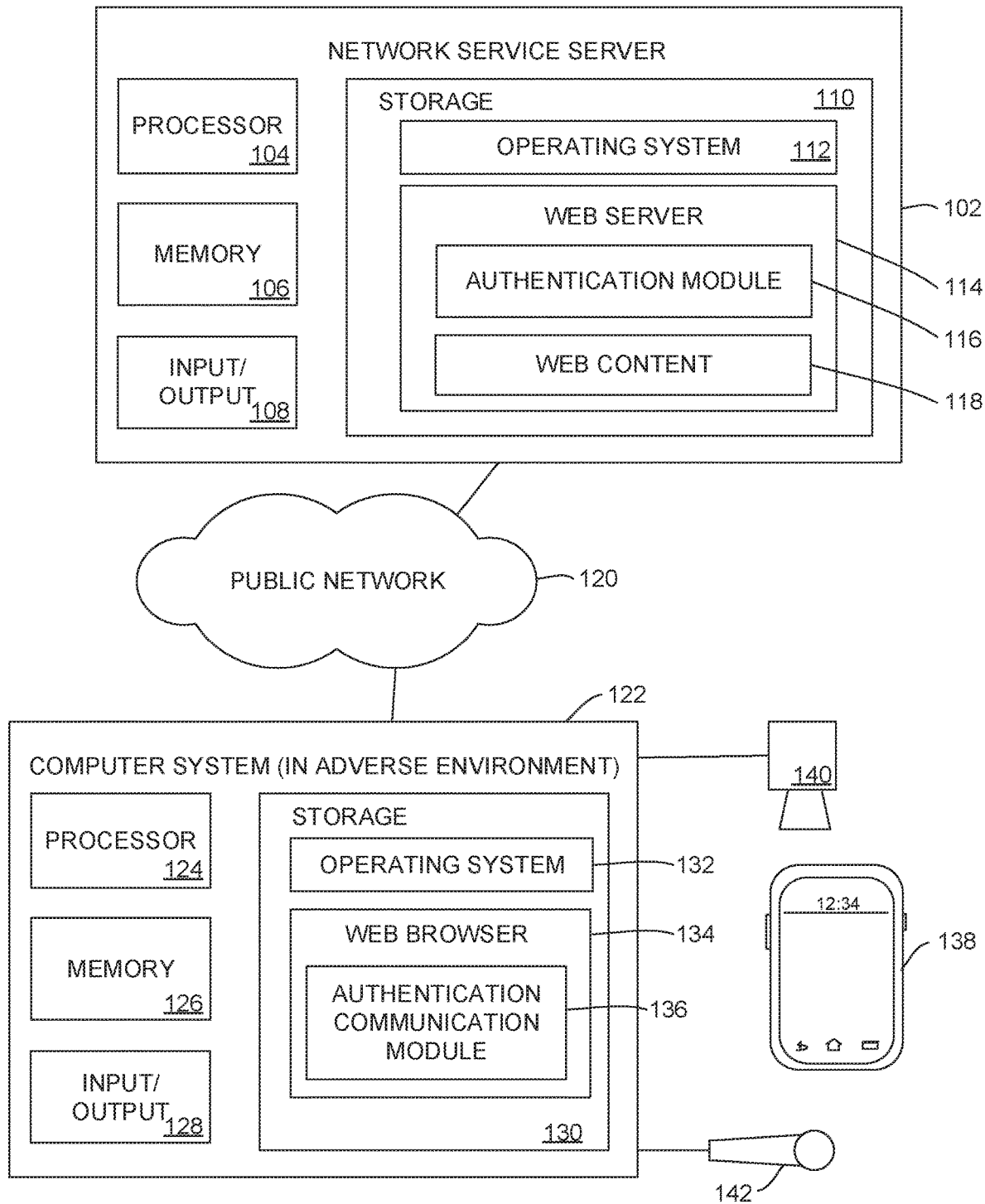
FIG. 1 shows a networked computer environment including a computer in an adverse environment, consistent with an example embodiment

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

A typical computer user has a wide variety of online accounts, such as social media accounts, banking and finance accounts, remote login access to work systems, accounts for managing health care, online shopping and e-commerce accounts, and accounts for managing utilities. Although these online accounts facilitate easy management and coordination of many aspects of one's life in that the accounts are accessible anywhere computer access can be found, the easily accessible nature of such accounts also makes them vulnerable to attach form unauthorized users. One mechanism by which such attacks are often carried out is to try to capture a user's login credentials, such as a user name and password, by either observing the user typing the credentials or by capturing the user's keystrokes during credential entry.

Capturing keystrokes is typically done using keystroke loggers, which can be implemented in hardware or software. Hardware keystroke loggers typically are inserted between the keyboard and the computer, such as by plugging the keystroke logger into a USB port of the computer and plugging the keyboard into the keystroke logger. Because the keystroke logger is typically small and installed in the back of a computer, it can be difficult to detect without explicitly looking for it, although it does require physical access to the computer to install and retrieve. Further, because a hardware keystroke logger works without any changes to the operating system or other software, it can't be detected by anti-malware or other security software.

Software keystroke loggers do require some modification to the operating system or other software on the computer system, such as by a user having access to the computer installing the software or using a Trojan or other malware delivery mechanism to install the keystroke logger software remotely. Although known keystroke logger software may be detected by anti-malware software, new versions are constantly being produced to avoid detection. Software keystroke loggers also may not need a password thief to return to the computer to retrieve logged keystrokes, but may use the computer's network connection to send the logged keystrokes to a remote system.

Keystroke loggers are therefore a significant threat in certain environments where many people have access to a computer, such as in a library, a coffee bar, a university computer room, or while using a shared computer at work. Threats such as losing a password in one of these adverse environments have led some online service providers to seek alternate or additional security measures for user authentication, such as requiring a user to use a secondary authentication method. Examples include requiring the user to enter a number sent by email or text to the user during the login process, using a fingerprint or other biometric scanner, or using a token-generating system such as a smartphone app that generates a token that changes every minute but that can be verified by the online service provider.

Although methods such as these do provide some additional security, they do not address the root problem of the user's password being potentially stolen in the adverse environment, thereby potentially revealing a password the user may use across a large number of other online services. Some examples described herein therefore seek to provide a mechanism for secure transfer of a user's password to an online service's login form, bypassing the keyboard or other unsecure elements of a computer system in an adverse environment.

FIG. 1 shows a networked computer environment including a computer in an adverse environment, consistent with an example embodiment. Here, a network service server is shown at 102, such as an e-commerce provider, a banking or finance website, or other online service. The network service server has a processor 104, memory 106, and input/output 108 such as a network connection, and storage 110. The storage holds an operating system 112, as well as a web server 114 that includes an authentication module 116 and web content 118.

A public network 120 such as the Internet links the network service server 102 to one or more remote computer systems 122, such as a user may employ to access and log on to the network service server. The remote computer system also includes a processor 124, a memory 126, and input/output components 128, as well as storage 130. The storage includes an operating system 132 that when executed provides a mechanism for software programs to run and to interact with computer components such as the input/output 128. The storage also includes a web browser 134, as may be used to log on to a website of a service provider, and an authentication communication module 136.

The authentication module 116 of a traditional network service server typically requires a user to enter identifying information such as a user ID or email address, along with a secret password known to the user and stored in hashed or encrypted form on the network service server. The network service server in such an example requires the user to enter a password to authenticate user identity to access at least some portion of the web site, such as pages relating to the user's financial accounts or online shopping purchases. The user typically enters a password on a web page served by the web server 114, such as via web browser 134 on a remote computer, and the authentication module 116 compares a hash of the entered password to a hash of the stored password to verify the user's identity.

But, because the computer system 122 in this example is in an adverse environment where it is not under the exclusive control of the user or those the user trusts, there is a significant risk in the user typing his password into the computer system 122's web browser using a keyboard. Hardware or software keystroke loggers may capture his password, or others may see the password being entered and discover the password. The computer system 122's authentication communication module in this example therefore provides for communication with a trusted user device such as a personal computer, a tablet, or smartphone 138, enabling the user to enter the password on a trusted device and securely communicate the password to the network service server 102.

Communication of the user's password information from the smartphone 138 to the computer system 122 is facilitated by an authentication communication module 136 on the computer system, such as a web applet served by network service server 102, and by attached hardware such as a camera 140 and a display (not shown), or a microphone 142 and a speaker (not shown). Because the smartphone 138 typically includes a camera and a display, as well as a microphone and a speaker, the smartphone and the computer system 122 can use sound and/or displayed imagery to communicate the password and other information between devices with reasonable security.

In a more detailed example, a user wishing to log on to an online service provided by network service server 102 loads a web page associated with the service which is provided by web server 114 using web browser 134. The user initiates a logon process on computer system 122, which causes authentication communication module 136 to be available for communication with smartphone 138, and in a further example causes authentication communication module 136 to initiate an authentication process such as generating a random challenge character string (generated in the computer system 122 or the network service server 102) and sending the random challenge to the smartphone 138 using either the computer system 122's display, speaker, or other physical medium.

The smartphone 138 receives the random challenge and encodes it using a hash of the password the user entered on the trusted smartphone (or that was provided by another mechanism, such as a password management app), and sends the encoded random challenge back to the computer system 122, again using a physical channel such as audio or imagery. The computer system's authentication module receives the encoded random challenge, and uses a stored or computed hash of the known password to encode its own copy of the random challenge, comparing the known password encoded random challenge with the entered password encoded random challenge to authenticate the user upon a match.

Use of a physical channel such as audio or visible imagery to send encoded password information between the computer system 122 in an adverse environment and the smartphone 138 or other trusted user device helps protect the confidentiality of the password, as it is more difficult to intercept than a password typed directly into a keyboard on the computer system 122. Further, sending a random challenge used only once, encoded with a hash of the entered password, further ensures that the password itself is not revealed over the physical communications channel, nor is the hash of the password, further enhancing security. Because the random challenge is used only a single time, someone capturing the random challenge encoded with the password hash cannot use the encoded random challenge to attempt to log in as the user at a later time, as the random challenge will have changed.

The video and imagery channels used in the example of FIG. 1 are examples of physical channels traditionally used to interact with a user, but that are used in the example presented here to facilitate communication between the user's smartphone 138 and the computer system 122 which is in an adverse environment where a password keyed directly into the computer may be susceptible to being intercepted or logged. The physical channel in one embodiment is sound, such as different amplitudes or frequencies of sounds played through the speaker of one device and detected by the microphone of another device. In another embodiment, the physical channel is optical, such as where imagery such as a barcode, QR code, or video is displayed on the monitor or display of one device and is detected by the camera of another device. Because using physical channels such as these for authentication is atypical, and because devices sending or detecting such physical communication are relatively easy for a user to observe or detect, the physical channels provide unique security advantages relative to using a keyboard.

Figure 2:
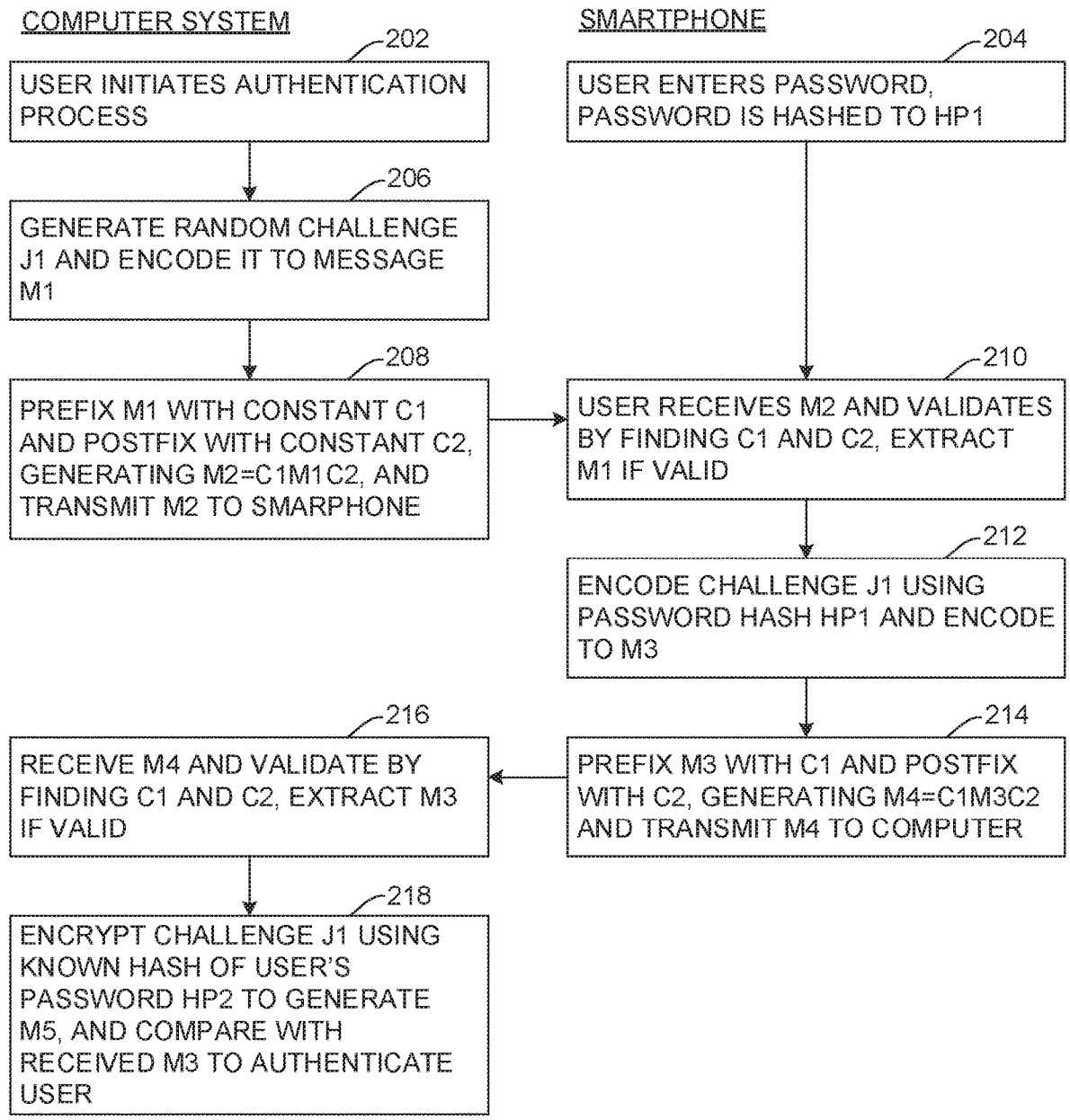
FIG. 2 is a flowchart of a method of authenticating a user using a trusted user device, consistent with an example embodiment.

FIG. 2 is a flowchart of a method of authenticating a user using a trusted user device, consistent with an example embodiment. A user wishing to log in to an online service using a password initiates the authentication process on a computer system that may not be trusted, such as a computer system in an adverse environment where the user does not have control over who has access to the computer, at 202. Initiation of the authentication process in a more detailed example comprises visiting a web page of the service provider to log in, and initiating a web applet or other software module on the computer system that is operable to perform various functions in the authentication process. Either the software on the computer system or software on the networked service provider's server generates a random challenge character string J1 at 206, and encodes it to message M1. The message M1 is appended with a known prefix C1 and a known suffix C2 to form M2, such that M2=C1M1C2, and the message M2 is transmitted to the smartphone at 208. Transmission to the smart phone in various further examples comprises use of physical communication channels such as audio, imagery, or other The user also enters a password on a trusted device such as a smartphone at 204, such as in a smartphone app, a tablet computer app, or a laptop or portable computer program. The smartphone receives M2 from the computer system, validates it by finding C1 and C2 in the message, and extracts message M1 if validation is successful at 210. The smartphone then encodes the random challenge J1 with a hash HP1 of the password entered by the user at 212, and encodes the result as message M3. Generating the message M3 can take any form that combines the hash HP1 of the password with the random challenge J1, such as a bitwise exclusive-OR of the password hash HP1 and the random challenge J1. The message M3 is appended with known prefix C1 and known suffix C2 at 214 to generate M4=C1M3C2, and M4 is sent from the smartphone to the computer via the physical communication channel.

At 216, the computer receives the message M4, and validates it by looking for known message prefix C1 and known message suffix C2. If the message is valid, C1 and C2 are removed, such that the message M3 comprising the random challenge encoded with a hash of the user's entered password is extracted. Authentication of the user's entered password is performed at 218, which in a further example takes place at least partly in the network service provider's server. In the example presented here, the network service provider stores a hash of the user's password generated using the same hash algorithm the smart phone used to generate the password hash HP1 for the user's entered password at 212. The stored hash of the user's known password HP2 is used to encode the random challenge message J1 using the same encoding method as used in the smartphone at 212 to generate message M5, and the resulting message M5 is compared with received message M3 such that if the messages are the same it is verified that the user entered the correct password at 204. Once the user is authenticated, the user is granted access to the online web service, and whatever user account information and permissions are associated with the user.

Physical communication channels in the examples presented above include user-perceivable physical communication channels, but in other examples will include other communication mechanisms present in both the computer and the smartphone, such as Near-Field Communication or NFC, infrared, or other such channels. When selecting a physical channel for communication, it is desirable that the channel be common for both computers and smartphones or other portable trusted user devices to send and receive.

Figure 3:
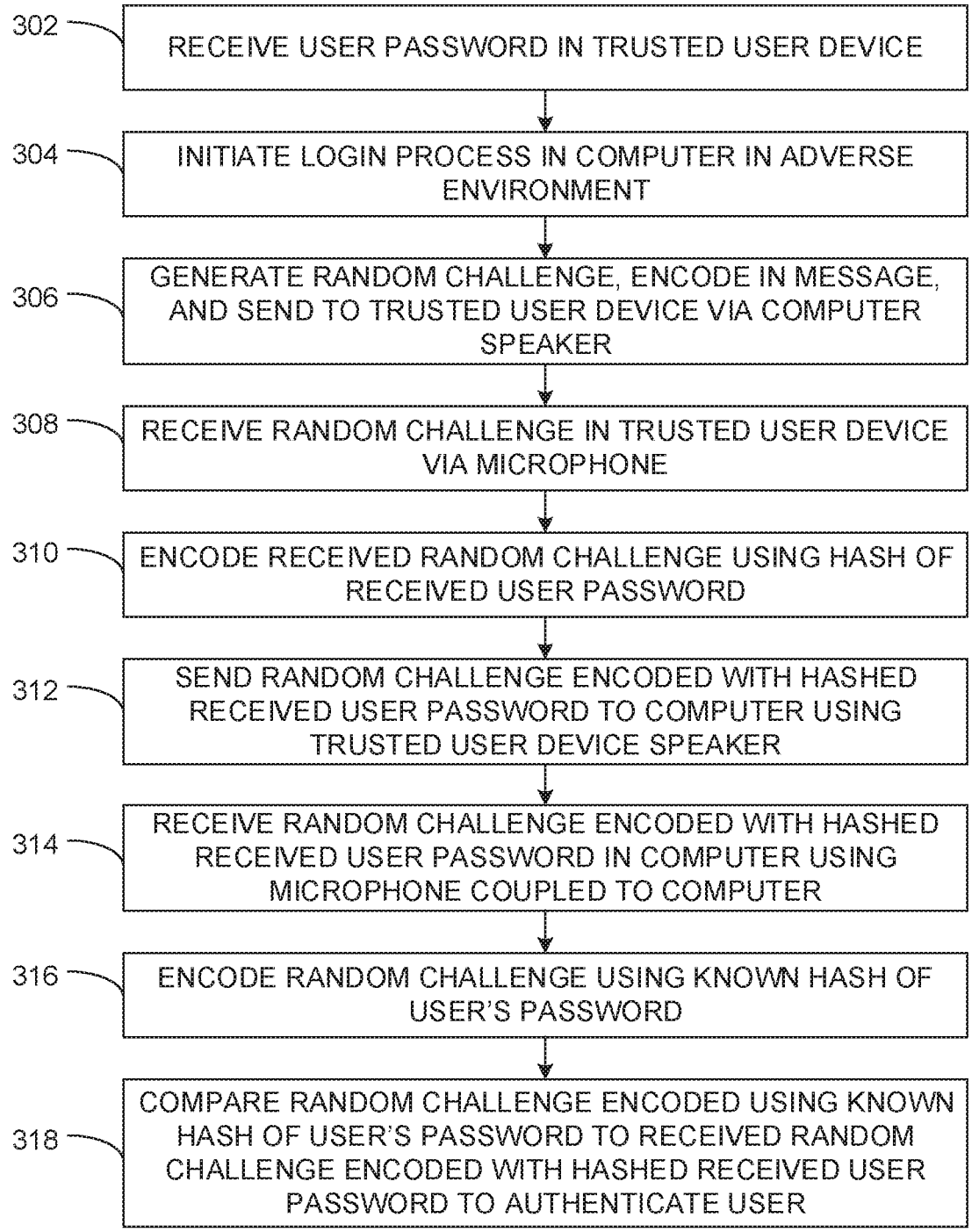
FIG. 3 is a flowchart illustrating a method of authenticating a user using audio to communicate with a trusted user device, consistent with an example embodiment.

FIG. 3 is a flowchart illustrating a method of authenticating a user using audio to communicate with a trusted user device, consistent with an example embodiment. A trusted user device, such as a smartphone, tablet, or personal computer owned by the user receives a user password at 302, such as in an applet or application executed to facilitate authentication to an online service. The login process is initiated in a computer at 304, which is a computer in an adverse environment not under the exclusive control of the user, such as in a library, a coffee shop, or a shared computer at work. At 306, the computer generates a random challenge character string, encodes the generated random challenge in a message, and sends the message to the trusted user device via a speaker of the computer. The message in various examples is sent using frequency-modulated coding, such as using different frequencies of audio, using amplitude modulation such as louder or softer periods of audio, or by varying these or other audio characteristics alone or in combination.

The trusted user device receives the random challenge in a message via a microphone coupled to the user device at 308, and at 310 encodes the received random challenge using a hash of the password received at 302. The encoded random challenge is then sent back from the trusted user device to the computer at 312, using a speaker on the trusted user device.

The computer receives the random challenge encoded with the hashed received user password at 314 via a microphone attached to the computer. The computer also encodes the random challenge using a known hash of the user's password at 316, such as a stored hash of the user's password commonly used in other password authentication processes. It then compares the random challenge encoded using the known hash of the user's password to the received random challenge encoded with the hashed received user password at 318, such that the user is authenticated if the challenges encoded with hashes of the known and received user passwords match.

Figure 4:
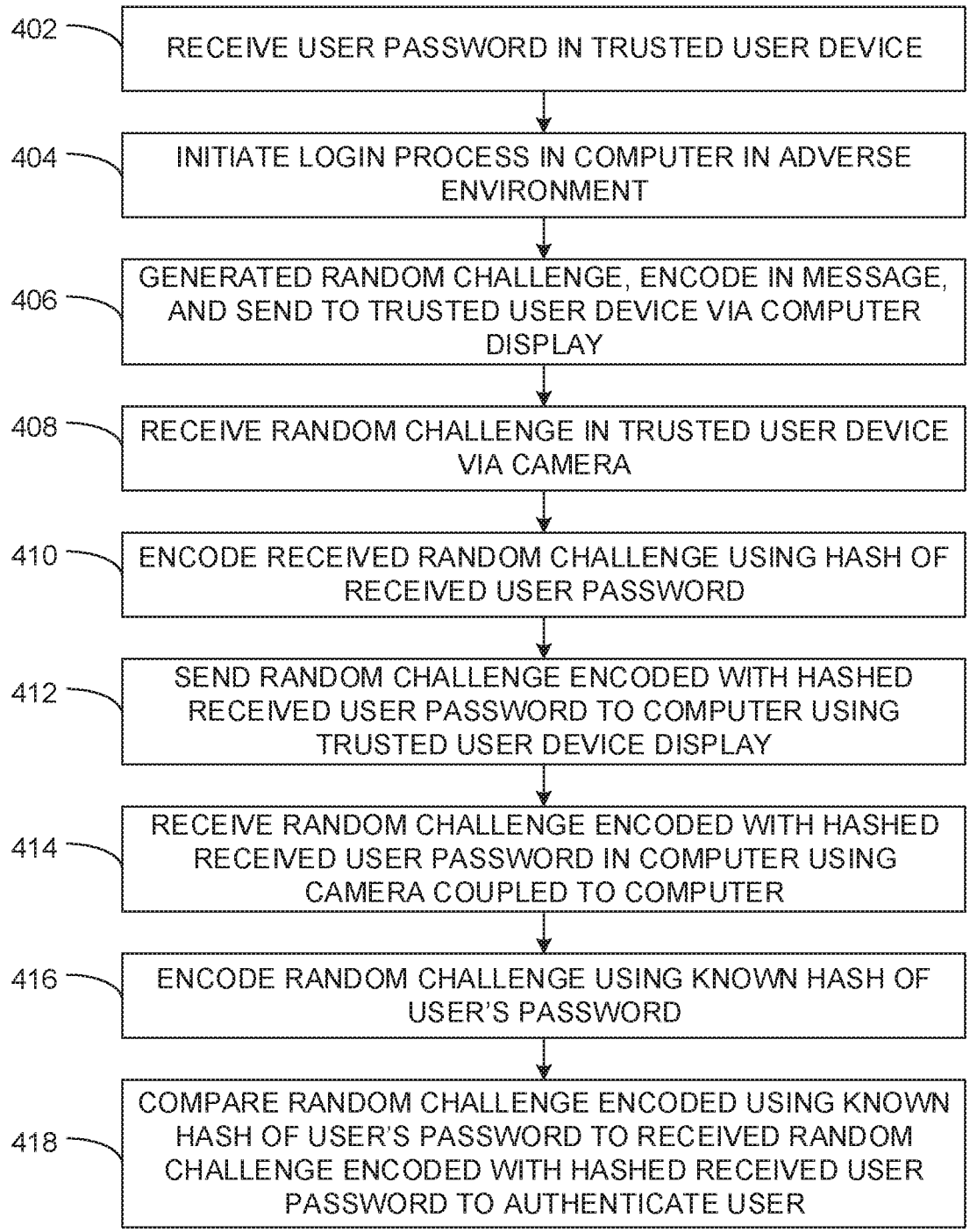
FIG. 4 is a flowchart illustrating a method of authenticating a user using imagery to communicate with a trusted user device, consistent with an example embodiment.

FIG. 4 is a flowchart illustrating a method of authenticating a user using imagery to communicate with a trusted user device, consistent with an example embodiment. As in the audio example of FIG. 3, a trusted user device, such as a smartphone, tablet, or personal computer owned by the user receives a user password at 402. The entered password is received by an applet or application executed on the trusted user device to facilitate authentication to an online service. The login process is also initiated in a computer at 404, which is a computer in an adverse environment not under the exclusive control of the user, such as in a library, a coffee shop, or a shared computer at work. At 406, the computer generates a random challenge character string, encodes the generated random challenge in a message, and sends the message to the trusted user device via a display of the computer. The message in various examples is sent using a barcode, a two-dimensional barcode such as a QR code, by varying the content of an image over time, or by varying these or other characteristics of a displayed image alone or in combination.

The trusted user device receives the random challenge in a message via a camera coupled to the user device at 408, and at 410 encodes the received random challenge using a hash of the password received at 402. The encoded random challenge is then sent back from the trusted user device to the computer at 412, using a display on the trusted user device.

The computer receives the random challenge encoded with the hashed received user password at 414 via a camera coupled to the computer. The computer also encodes the random challenge using a known hash of the user's password at 416, such as a stored hash of the user's password commonly used in other password authentication processes. It then compares the random challenge encoded using the known hash of the user's password to the received random challenge encoded with the hashed received user password at 418, such that the user is authenticated if the challenges encoded with hashes of the known and received user passwords match.

The examples presented herein illustrate how communications channels other than a keyboard can be used to receive user password information in a computer in an adverse environment, and how various physical communications channels such as audio and imagery can be used to exchange information such as a random challenge character string and an encoded version of a hashed password to authenticate a user. The trusted user device, the computer in an adverse environment, and the networked service server in the various examples presented herein are implemented in computerized systems that can take many forms, and are configured in various embodiments to perform the various functions described herein.

Figure 5:
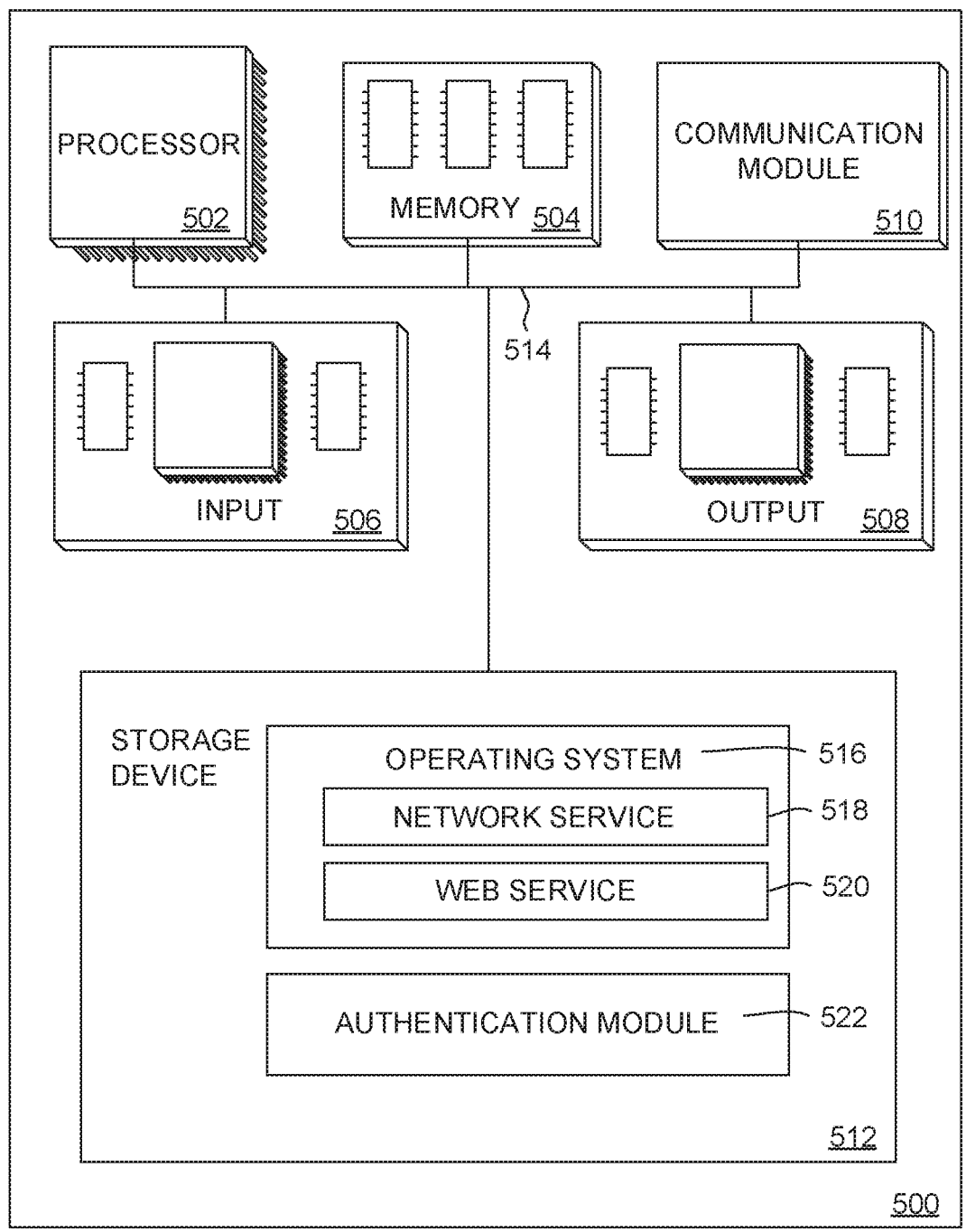
FIG. 5 is a computerized system comprising an authentication module, consistent with an example embodiment.

FIG. 5 is a computerized system comprising an authentication module, consistent with an example embodiment. FIG. 5 illustrates only one particular example of computing device 500, and other computing devices 500 may be used in other embodiments. Although computing device 500 is shown as a standalone computing device, computing device 500 may be any component or system that includes one or more processors or another suitable computing environment for executing software instructions in other examples, and need not include all of the elements shown here.

As shown in the specific example of FIG. 5, computing device 500 includes one or more processors 502, memory 504, one or more input devices 506, one or more output devices 1008, one or more communication modules 510, and one or more storage devices 512. Computing device 500, in one example, further includes an operating system 516 executable by computing device 500. The operating system includes in various examples services such as a network service 518 and a virtual machine service 520 such as a virtual server. One or more applications, such as network traffic anomaly training module 522 are also stored on storage device 512, and are executable by computing device 500.

Each of components 502, 504, 506, 508, 510, and 512 may be interconnected (physically, communicatively, and/or operatively) for inter-component communications, such as via one or more communications channels 514. In some examples, communication channels 514 include a system bus, network connection, inter-processor communication network, or any other channel for communicating data. Applications such as authentication module 522 and operating system 516 may also communicate information with one another as well as with other components in computing device 500.

Processors 502, in one example, are configured to implement functionality and/or process instructions for execution within computing device 500. For example, processors 502 may be capable of processing instructions stored in storage device 512 or memory 504. Examples of processors 502 include any one or more of a microprocessor, a controller, a digital signal processor (DSP), an application specific integrated circuit (ASIC), a field-programmable gate array (FPGA), or similar discrete or integrated logic circuitry.

One or more storage devices 512 may be configured to store information within computing device 500 during operation. Storage device 512, in some examples, is known as a computer-readable storage medium. In some examples, storage device 512 comprises temporary memory, meaning that a primary purpose of storage device 512 is not long-term storage. Storage device 512 in some examples is a volatile memory, meaning that storage device 512 does not maintain stored contents when computing device 500 is turned off. In other examples, data is loaded from storage device 512 into memory 504 during operation. Examples of volatile memories include random access memories (RAM), dynamic random access memories (DRAM), static random access memories (SRAM), and other forms of volatile memories known in the art. In some examples, storage device 512 is used to store program instructions for execution by processors 502. Storage device 512 and memory 504, in various examples, are used by software or applications running on computing device 500 such as authentication module 522 to temporarily store information during program execution.

Storage device 512, in some examples, includes one or more computer-readable storage media that may be configured to store larger amounts of information than volatile memory. Storage device 512 may further be configured for long-term storage of information. In some examples, storage devices 512 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication modules 510. Computing device 500 in one example uses communication module 510 to communicate with external devices via one or more networks, such as one or more wireless networks. Communication module 510 may be a network interface card, such as an Ethernet card, an optical transceiver, a radio frequency transceiver, or any other type of device that can send and/or receive information. Other examples of such network interfaces include Bluetooth, 4G, LTE, 5G, WiFi, Near-Field Communications (NFC), and Universal Serial Bus (USB). In some examples, computing device 500 uses communication module 510 to wirelessly communicate with an external device such as via public network 120 of FIG. 1.

Computing device 500 also includes in one example one or more input devices 506. Input device 506, in some examples, is configured to receive input from a user through tactile, audio, or video input. Examples of input device 506 include a touchscreen display, a mouse, a keyboard, a voice responsive system, video camera, microphone, or any other type of device for detecting input from a user.

One or more output devices 508 may also be included in computing device 500. Output device 508, in some examples, is configured to provide output to a user using tactile, audio, or video stimuli. Output device 508, in one example, includes a display, a sound card, a video graphics adapter card, or any other type of device for converting a signal into an appropriate form understandable to humans or machines. Additional examples of output device 508 include a speaker, a light-emitting diode (LED) display, a liquid crystal display (LCD), or any other type of device that can generate output to a user.

Computing device 500 may include operating system 516. Operating system 516, in some examples, controls the operation of components of computing device 500, and provides an interface from various applications such as authentication module 522 to components of computing device 500. For example, operating system 516, in one example, facilitates the communication of various applications such as authentication module 522 with processors 502, communication unit 510, storage device 512, input device 506, and output device 508. Applications such as authentication module 522 may include program instructions and/or data that are executable by computing device 500. These and other program instructions or modules may include instructions that cause computing device 500 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of authenticating a user to a computer in an adverse environment, comprising:
   receiving a user's password in a trusted user device;
   initiating a login process in the computer;
   generating a random challenge comprising a character string in the computer;
   encoding generated random challenge in a first message and appending a known prefix and a known suffix to the first message to generate a random challenge message in the computer;
   sending the random challenge message to the trusted user device via a speaker coupled to the computer, wherein the generated random challenge is used a single time in authenticating the user;
   receiving the random challenge message in the trusted user device via a microphone coupled to the trusted user device;
   validating the received random challenge message by finding the known prefix and the known suffix in the random challenge message and extracting the generated random challenge in the trusted user device;
   encoding the extracted random challenge using a hash of the user's received password in the trusted user device to generate an entered password hash-encoded random challenge, wherein encoding the random challenge comprises performing a bitwise exclusive-OR of the hash of the user's received password and the random challenge;
   sending the entered password hash-encoded random challenge from the user's trusted device to the computer via a speaker coupled to the user's trusted device;
   receiving the entered password hash-encoded random challenge in the computer via a microphone coupled to the computer;
   encoding the random challenge using a known hash value of the user's password to generate a known password hash-encoded random challenge; and
   authenticating the user by comparing the known password hash-encoded random challenge to the entered password hash-encoded random challenge in the computer.

2. The method of authenticating a user to a computer in an adverse environment of claim 1, further comprising appending one or more communications between the trusted user device and the computer with at least one of a known prefix and a known suffix in a sending device, and verifying the known prefix and/or the known suffix in the receiving device to verify integrity of the message.

3. The method of authenticating a user to a computer in an adverse environment of claim 1, wherein one or more communications between the trusted device and the computer comprise a frequency modulated signal or an amplitude modulated signal.

4. The method of authenticating a user to a computer in an adverse environment of claim 1, wherein the trusted device comprises a smartphone, a personal computer, or a tablet computer.

5. The method of authenticating a user to a computer in an adverse environment of claim 1, wherein the computer queries an authentication server in comparing the known password hash-encoded random challenge to the entered password hash-encoded random challenge in the computer to authenticate the user.

6. The method of authenticating a user to a computer in an adverse environment of claim 1, wherein the generated random challenge is changed for every authentication transaction.

7. The method of authenticating a user to a computer in an adverse environment of claim 1, wherein the adverse environment comprises an environment where the user does not have exclusive control of the computer.

8. The method of authenticating a user to a computer in an adverse environment of claim 1, wherein receiving the user's password in a trusted user device comprises receiving the password from the user via a keyboard or via a password management application.

9. A method of authenticating a user to a computer in an adverse environment, comprising:
receiving a user's password in a trusted user device;
initiating a login process in the computer;
generating a random challenge comprising a character string in the computer;
encoding generated random challenge in a first message and appending a known prefix and a known suffix to the first message to generate a random challenge message in the computer;
sending the random challenge message to the trusted user device via a display coupled to the computer, wherein the generated random challenge is used a single time in authenticating the user;
receiving the random challenge message in the trusted user device via a camera coupled to the trusted user device;
validating the received random challenge message by finding the known prefix and the known suffix in the random challenge message and extracting the generated random challenge in the trusted user device;
encoding the extracted random challenge using a hash of the user's password in the trusted user device to generate an entered password hash-encoded random challenge, wherein encoding the random challenge comprises performing a bitwise exclusive-OR of the hash of the user's received password and the random challenge;
sending the entered password hash-encoded random challenge from the user's trusted device to the computer via a display coupled to the user's trusted device;
receiving the entered password hash-encoded random challenge in the computer via a camera coupled to the computer;
encoding the random challenge using a known hash value of the user's password to generate a known password hash-encoded random challenge; and
authenticating the user by comparing the known password hash-encoded random challenge to the entered password hash-encoded random challenge in the computer.

10. The method of authenticating a user to a computer in an adverse environment of claim 9, further comprising appending one or more communications between the trusted user device and the computer with at least one of a known prefix and a known suffix in a sending device, and verifying the known prefix and/or the known suffix in the receiving device to verify integrity of the message.

11. The method of authenticating a user to a computer in an adverse environment of claim 9, wherein one or more communications between the trusted device and the computer comprise a barcode, a QR code, or optical character recognition.

12. The method of authenticating a user to a computer in an adverse environment of claim 9, wherein the trusted device comprises a smartphone, a personal computer, or a tablet computer.

13. The method of authenticating a user to a computer in an adverse environment of claim 9, wherein the computer queries an authentication server in comparing the known password hash-encoded random challenge to the entered password hash-encoded random challenge in the computer to authenticate the user.

14. The method of authenticating a user to a computer in an adverse environment of claim 9, wherein the generated random challenge is changed for every authentication transaction.

15. The method of authenticating a user to a computer in an adverse environment of claim 9, wherein the adverse environment comprises an environment where the user does not have exclusive control of the computer.

16. The method of authenticating a user to a computer in an adverse environment of claim 9, wherein receiving the user's password in a trusted user device comprises receiving the password from the user via a keyboard or via a password management application.

* * * * *